Figure 1:
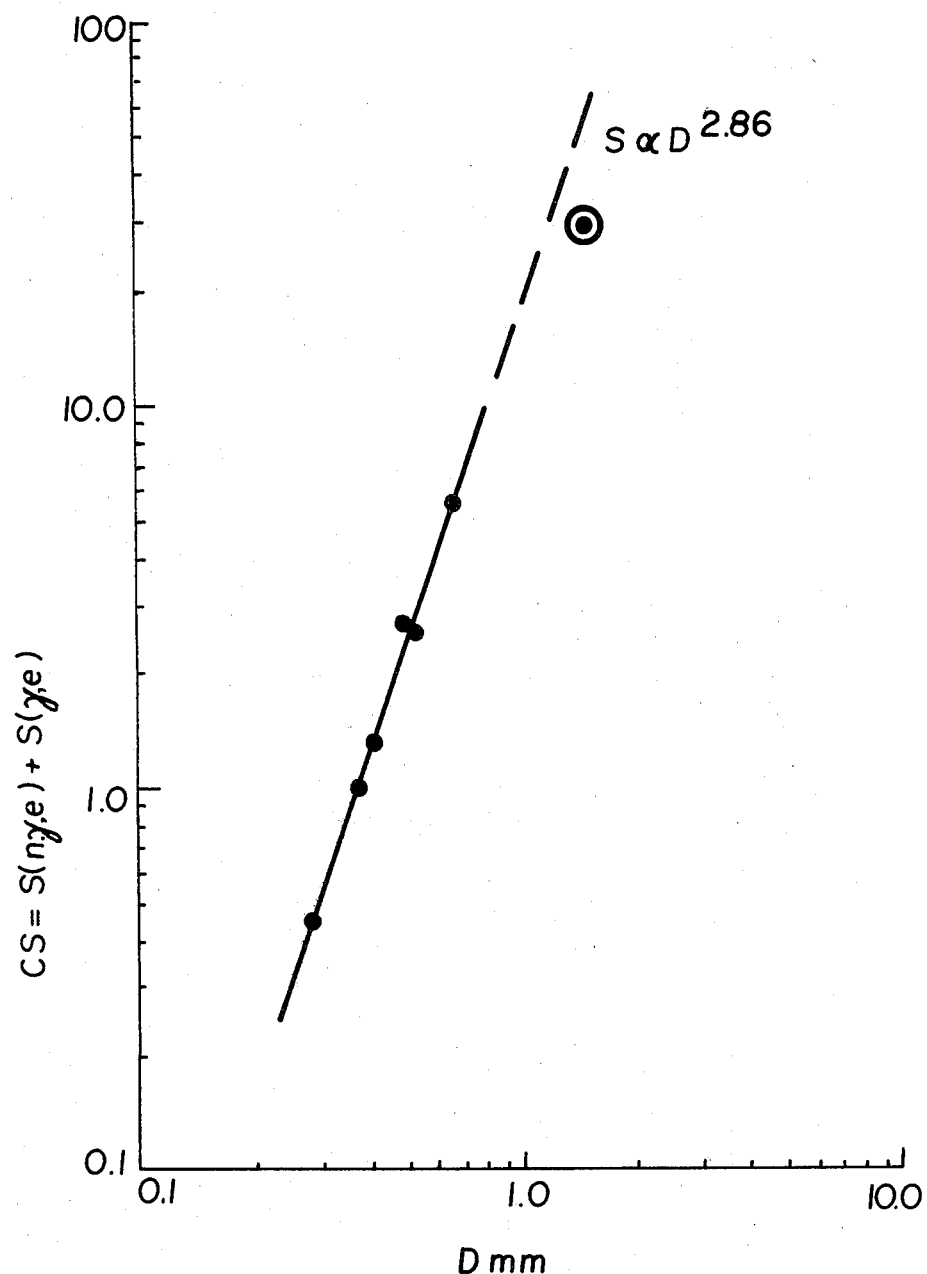

United States Patent [19]

Allan et al.

[11] 4,363,970
[45] Dec. 14, 1982

[54] SELF-POWERED NEUTRON FLUX DETECTOR ASSEMBLY

[75] Inventors: Colin J. Allan; Ian L. McIntyre, both of Ontario, Canada

[73] Assignee: Atomic Energy of Canada Limited, Ottawa, Canada

[21] Appl. No.: 150,809

[22] Filed: May 19, 1980

[30] Foreign Application Priority Data

Aug. 13, 1979 [CA] Canada ................................. 334534

[51] Int. Cl.$^3$ .............................................. G01T 3/00
[52] U.S. Cl. .................................................. 250/390
[58] Field of Search ........................ 250/390, 391, 392

[56] References Cited

U.S. PATENT DOCUMENTS 3,904,881 9/1975 Klar et al. ............................ 250/390
4,002,916 1/1977 Stringer ................................ 250/390

Primary Examiner—Alfred E. Smith
Assistant Examiner—Carolyn E. Fields
Attorney, Agent, or Firm—Francis W. Lemon

[57] ABSTRACT

A prompt responding, coaxial, self-powered neutron flux detector assembly is provided wherein the emitter electrode is at least of the order of 0.9 mm in diameter and is of metal selected from iron, nickel, titanium, chromium or alloys based on these elements so that at least 90% of the total electrical current induced in the detector is prompt and will be derived from (n,γ,e) interactions in said metal, the tubular collector electrode is of one of these materials with zirconium or zirconium alloys included in the group and in use these electrodes are connected directly to the measuring instrument or are connected to the measuring instrument via a lead cable. When a lead is used having conductors of similar metals to the detector electrodes, then for (i) a coaxial lead cable the emitter electrode diameter is ≳4 times the diameter of the lead cable core wire, (ii) a coaxial lead cable where a second lead cable is provided to compensate for the contribution to the total signal from the lead cable, the emitter electrode diameter is ≳2.5 times the diameter of the lead cable core wire, or (iii) a twin-core lead cable the emitter electrode diameter is ≳2.5 times that of each of the twin inner conductors.

8 Claims, 5 Drawing Figures

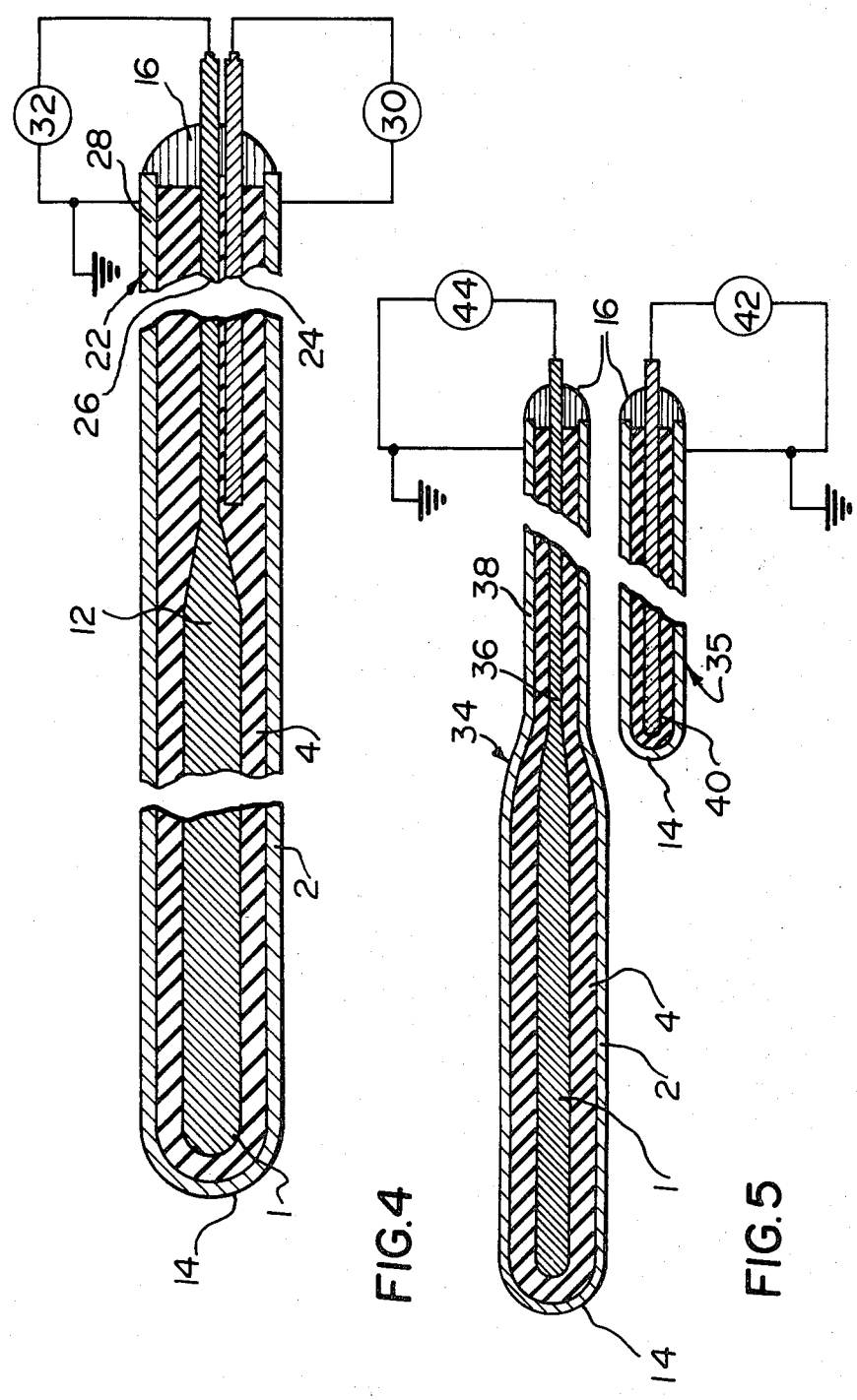

SELF-POWERED NEUTRON FLUX DETECTOR ASSEMBLY

This invention relates to a self-powered neutron flux detector assembly. Self-powered neutron flux detectors are in wide-spread use in nuclear reactors. Typically, they consist of a coaxial cable, having a metallic outer sheath, usually called the collector electrode and frequently a Ni-Cr-Fe alloy, such as Inconel 600 (Trade Mark), a mineral oxide insulation layer, usually MgO or $Al_2O_3$, and a metallic central wire, usually called the emitter electrode. When such a device is placed in a radiation field, for example the neutron field in the core of a nuclear reactor, and the central conductor emitter electrode is electrically connected to the sheath collector electrode through an ammeter, an electrical current flows between the two electrodes without an external bias being applied. The magnitude of the electrical current is proportional to the intensity of the radiation field, and hence can be used as a measure of the strength of the field.

In a nuclear reactor, the electrical current flow in self-powered neutron flux detectors can be attributed to three main causes:

1. Neutron capture in the emitter and collector electrode materials of the detector can result in the formation of radioactive daughter nuclides which decay by $\beta$-decay. These high-energy electrons, emitted by the radioactive daughter nuclides, are responsible for an electrical current flow between the two electrodes. This interaction is hereinafter referred to as the $(n,\beta)$ interaction. In some self-powered neutron detectors the detector materials are chosen so that $(n,\beta)$ interactions in the emitter are the dominant current producing mechanism. The electrical current is proportional to the neutron flux intensity but has a time constant determined by the half-life of the radioactive daughter nuclide. The $(n,\beta)$ interaction is the dominant electrical current-producing mechanism in self-powered neutron flux detectors with a vanadium or rhodium emitter electrode as described in U.S. Pat. No. 3,375,370, dated Mar. 26, 1968, "Self-Powered Neutron Detector", J. W. Hilborn.

2. Neutron capture in the emitter and collector electrode materials of the detector is normally accompanied by the emission of prompt capture $\gamma$-rays. These $\gamma$-rays can then interact with the emitter and collector electrode materials of the detector, liberating high-energy electrons, via Compton and photo-electric processes, thus causing an electrical current flow. This interaction is hereinafter referred to as the $(n,\gamma,e)$ interaction. In other self-powered neutron detectors the detector materials are chosen so that $(n,\gamma,e)$ interactions in the emitter are the dominant current producing mechanism. The electrical current is proportional to the neutron intensity and is prompt, i.e. the electrical current follows changes in neutron flux intensity instantaneously. This is the main electrical current-producing mechanism in self-powered neutron flux detectors, as described in the Hilborn patent, having cobalt emitter electrodes, when the detectors are first put to use, and is an important current-producing mechanism in self-powered neutron flux detectors having a platinum emitter electrode as described in U.S. Pat. No. 3,787,697 dated Jan. 22, 1974, "Neutron and Gamma Flux Detector", R. B. Shields, or a molybdenum emitter electrode as described in U.S. Pat. No. 4,140,910, dated Feb. 20, 1979, "Self-Powered Neutron Flux Detector", J. Kroon.

3. Gamma rays from the nuclear reactor itself, impinging on the detector, can liberate free electrons, thus producing an electrical current flow. This interaction is hereinafter referred to as the $(\gamma,e)$ interaction. In a nuclear reactor, these external $\gamma$-rays result from neutron capture in the fuel and the nuclear reactor hardware. Hence the $\gamma$-ray flux, and the $(\gamma,e)$-induced electrical current, are proportional to the neutron flux. The basic detector interaction is prompt, but in a nuclear reactor a significant fraction of the $\gamma$-rays are delayed, i.e. those $\gamma$-rays arising from the decay of fission products and activation products. Hence, the $(\gamma,e)$-induced electrical current does not follow changes in flux completely instantaneously, but has a delayed component. The $(\gamma,e)$ interaction is an important electrical current-producing mechanism in detectors having a platinum or molybdenum emitter electrode and indeed in any detector in which the atomic number of the emitter electrode material is large, relative to that of the collector electrode material.

For completeness, it should be pointed out that external electrons from the reactor hardware and materials, impinging on the detector, can contribute to the overall output current. Such interactions, however, are considered parasitic, and an attempt is usually made to minimize them. As well, gamma radiation and neutrons also induce electrical currents in the lead cable connecting the self-powered detector to the electrical current-meter. However, this can be compensated for, as hereinafter will be explained, by 1. choosing the lead cable materials and dimensions such that the net current is small, relative to that produced in the detector, 2. using twin conductors in the lead cable, or 3. by measuring the current produced in a separate lead cable.

In any self-powered flux detector, all three interactions, $(n,\beta)$, $(n,\gamma,e)$ and $(\gamma,e)$ occur, and the net electrical current is the sum of the individual electrical currents arising from the different interactions. For some detectors, such as those with vanadium emitter electrodes, $(n,\beta)$, or cobalt emitter electrodes, $(n,\gamma,e)$, one of the interactions will dominate, but in other detectors, such as those with platinum emitter electrodes, $(n,\gamma,e)$ plus $(\gamma,e)$, two or more interactions will be important. However, in general all three interactions will produce measurable electrical currents and must be accounted for in an accurate description of the response of a detector.

Because the $(n,\gamma,e)$ interaction produces a prompt electrical current signal, i.e. one which follows changes in neutron flux essentially instantaneously, while the $(n,\beta)$ and $(\gamma,e)$ interactions result in delayed electrical current signals, a detector in which the $(n,\gamma,e)$ interaction dominates is preferable in many applications, and particularly if the detector is to be used in a reactor safety system. A detector having a cobalt emitter electrode is such a device, at least at the beginning of its life.

Initially, the electrical current from a detector having a cobalt emitter electrode is dominated by the $(n,\gamma,e)$ interaction, caused by neutron capture in $^{59}Co$. However, with time, electrical currents attributable to the radioactive decay of $^{60}Co$ and $^{61}Co$ build up. At any given time the current due to $^{60}Co$ can be considered constant, because of this nuclide's long half-life, 5.26 a, but the electrical current attributable to $^{61}Co$ is proportional to the neutron flux, and follows changes in flux, but with a time constant of 130 minutes. Thus, with irradiation, the prompt (n,γ,e) electrical current decreases as $^{59}$Co burns out, while the delayed currents from $^{60}$Co and $^{61}$Co increase, so that the electrical current from a detector having a cobalt emitter electrode becomes less and less prompt with time. In a so-called CANDU nuclear reactor, which is a heavy-water moderated, natural-uranium, pressure tube reactor, it has been observed that after a mere 3 years of operation, as much as 19% of the electrical current signal can be attributed to the decay of $^{60}$Co and as much as 23% to the decay of $^{61}$Co, so that only ~58% of the total signal is prompt.

From the above, it will be seen that a self-powered neutron flux detector having a cobalt emitter electrode has a relatively short useful lifetime in a a high-flux nuclear reactor. In general, this will be true of most self-powered neutron flux detectors in which (n,γ,e) interactions are mainly responsible for the electrical current. This is because the electrical current results from a two-step process, neutron capture, in which a γ-ray is emitted, followed by the liberation of a free electron, via Compton and photo-electric interactions of the γ-ray with the materials of the detector. The inherent sensitivity of such detectors is thus low. For example, the initial sensitivity per unit length of a detector, having a cobalt emitter electrode 0.5 mm in diameter, is about a factor of 20 smaller than a detector with a vanadium emitter electrode of the same diameter, even though cobalt has a neutron absorption cross section which is almost a factor of 8 times that of vanadium. Thus, to achieve a useful sensitivity, i.e. one such that the electrical currents associated with the (n,β) and (γ,e) interactions are small, relative to the electrical current produced by the (n,γ,e) interaction, and such that the total electrical current produced in the detector is large, relative to the electrical current produced in the detector lead cable, it has, prior to the present invention, been thought necessary to use an emitter electrode material with a relatively large neutron cross section. However, if the cross section is large, the burn-out rate will be rapid, so that the detector sensitivity will decrease relatively rapidly. This is especially true in a heavy-water moderated, natural uranium, nuclear reactor, where the neutron flux is $\sim 2 \times 10^{18}$ n·m$^{-2}$·s$^{-1}$. In such a flux, an emitter electrode having a neutron cross section of only 5 b (1 b=10$^{-28}$m$^2$) will burn out at a rate of ~3% per year.

There is a need for a self-powered neutron flux detector in which the electrical current from (n,γ,e) interaction dominates, so that the detector follows changes in neutron flux more or less instantaneously, combined with the additional advantage that the detector employs a low neutron cross section material, for the emitter electrode, so that the burnout rate of the detector is acceptably small.

According to the present invention, there is provided a self-powered neutron flux detector assembly comprising (a) an emitter electrode of substantially circular cross section, at least of the order of 0.9 mm in diameter, (b) a tubular collector electrode enclosing and coaxial with the emitter electrode, and (c) dielectric material between the said electrodes, and wherein the improvement comprises, (d) the emitter electrode is of metal selected from the group consisting of iron, nickel, titanium, chromium and alloys based on at least one of these elements, except for impurities, so that at least of the order of 90% of the total electrical current that will be induced in the emitter electrode is prompt and is derived from (n,γ,e) interactions in said metal, and (e) the collector electrode is of metal selected from the group consisting of iron, nickel, titanium, chromium, zirconium and alloys based on at least one of these materials, except for impurities.

In some embodiments of the present invention the self-powered neutron flux detector extends through the reactor core and shielding to the ammeter, used to measure the current difference between the detector electrodes, and the detector is used to measure the average flux along the length of the detector.

In other embodiments of the present invention, where the self-powered neutron flux detector is used to provide a measure of the average flux over a localized region of a reactor core, the detector assembly includes a coaxial mineral insulated lead cable, to electrically connect the detector electrodes to the ammeter, used to measure the electrical current difference between the detector electrodes. The lead cable has a core wire selected from the group consisting of iron, nickel, titanium, chromium, zirconium and alloys based on at least one of these materials except for impurities, and an outer conductor selected from the group consisting of iron, nickel, titanium, chromium, zirconium, and alloys based on at least one of these materials, except for impurities, and the emitter electrode has a diameter at least of the order of four times that of the core wire of the lead cable.

In other embodiments of the present invention where the self-powered neutron flux detector is used to provide a measure of the average flux over a localized region of a reactor core, the detector assembly includes a coaxial mineral insulated lead cable to electrically connect the detector electrodes to the ammeter, used to measure the electrical current difference between the detector electrodes and a second coaxial mineral insulated lead cable which is substantially identical to the first lead cable and is provided to compensate for any electrical current induced directly in the first lead cable. Both of the lead cables have core wires selected from the group consisting of iron, nickel, titanium, chromium, zirconium, and alloys based on at least one of these materials, except for impurities, and outer conductors selected from the group consisting of iron, nickel, titanium, chromium, zirconium, and alloys based on at least one of these materials, except for impurities, and the emitter diameter is at least of the order of 2.5 times the diameter of each of the lead cable core wires.

In other embodiments of the present invention where the self-powered neutron flux detector is used to provide a measure of the average flux over a localized region of a reactor core, the detector assembly includes a twin-core mineral insulated lead cable, to electrically connect the detector electrodes to the ammeter, used to measure the electrical current difference between the detector electrodes. The twin core wire conductors are of substantially the same diameter and material, selected from the group comprising iron, nickel, titanium, chromium, zirconium and alloys based on at least one of these elements, except for impurities, and an outer conductor is selected from the group comprising iron, nickel, titanium, chromium, zirconium, and alloys based on at least one of these materials, except for impurities, and the emitter electrode is electrically connected to only one of the core wire conductors and the emitter electrode has a diameter at least of the order of 2.5 times that of the core wire conductors.

In some embodiments of the present invention the emitter and collector electrodes are of the same metal.

In other embodiments of the present invention the emitter electrode, the collector electrode, and the lead cable conductors are of the same metal.

Figure 2:
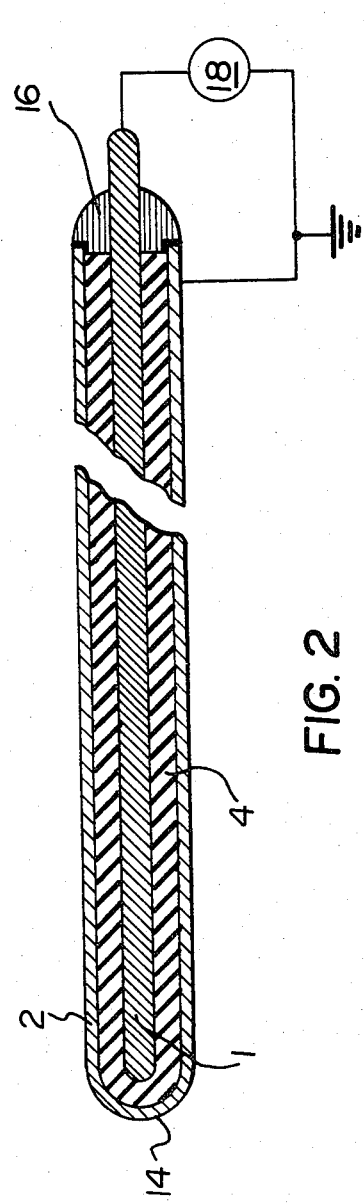
Figure 3:
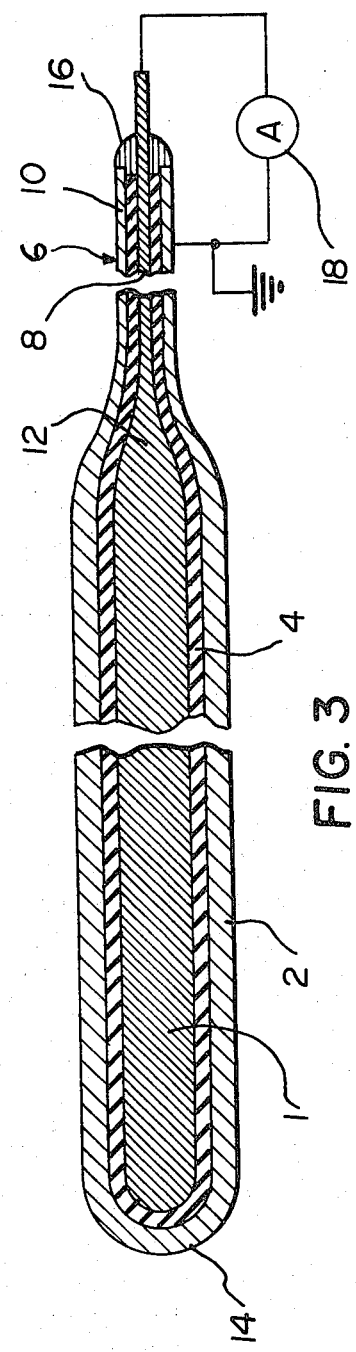

In the accompanying drawings which illustrate, by way of example, embodiments of the present invention, FIG. 1 is a graph of the relative sensitivity, $CS = S(n,\gamma,e) + S(\gamma,e)$, plotted against the core-wire diameter, D, of an Inconel-Inconel Mineral Insulated Cable, FIG. 2 is a sectional side view of portions of a self-powered neutron flux detector assembly connected to a means for measuring an electrical current difference between electrodes of the assembly, FIG. 3 is a sectional side view of a different self-powered neutron flux detector assembly to that shown in FIG. 2, also connected to a means for measuring an electrical current difference between electrodes of the assembly, FIG. 4 is a sectional side view of a different self-powered neutron flux detector assembly to those shown in FIGS. 2 and 3 also connected to a means for measuring an electrical current difference between the electrodes of the assembly, and FIG. 5 is a sectional side view of a different self-powered neutron flux detector assembly to those shown in FIGS. 2, 3 and 4, also connected to a means for measuring an electrical current difference between the electrodes of the assembly.

The self-powered neutron flux detector according to the present invention was conceived from an experimental investigation of the effects of irradiation on mineral insulated (MI) cables, having Inconel 600 core wire conductors and Inconel 600 sheaths or outer conductors. In a nuclear reactor the active portion (i.e. the portion containing the collector and emitter electrodes) of a detector is usually connected to the measuring instrument by means of a mineral insulated (MI) lead cable. The lead cable itself acts as a self-powered neutron flux detector but by an appropriate choice of materials and dimensions, the electrical current signal from the lead cable conductors can be made small relative to the electrical current signal from the detector electrodes. For the detectors used in CANDU reactors, the lead cables are normally coaxial, with the central core wire conductor and sheath conductor being manufactured from Inconel 600, a nickel-based alloy containing nominally 76% Ni, 15.5% Cr and 8% Fe. The insulation is MgO. Conventionally, the outside diameter of the lead cables used in most applications is 1.0 mm, and the electrical current generated in it is ≲ a few percent of the total current generated in the detector.

The total electrical current, $I_{Total}$, generated in an MI lead cable having an Inconel core wire conductor and sheath conductor, hereinafter referred to as an Inconel-Inconel MI cable, as in any self-powered neutron flux detector, is attributed to the three interactions described above, $(n,\beta)$, $(n,\gamma,e)$ and $(\gamma,e)$, and it can be expressed as $$I_{Total} = I(n,\beta) + I(n,\gamma,e) + I(\gamma,e) \quad (1)$$

where $I(n,\gamma,e)$ is the electrical current which results primarily from neutron capture in the Inconel core wire conductor of the lead cable. It is proportional to the neutron flux, prompt, and positive.

$I(\gamma,e)$ is the electrical current which results from interactions of reactor $\gamma$-rays with the lead cable. From experiments performed in a $^{60}$Co GAMMACELL it is known that $I(\gamma,e)$ is negative, i.e. external $\gamma$-rays cause a net flow of electrons from the Inconel sheath conductor to the Inconel core wire conductor. The interaction in the lead cable itself is prompt, but because some of the $\gamma$-rays in a reactor are delayed, the $\gamma$-ray electrical current has a delayed component.

$I(n,\beta)$ is the electrical current which results from the $\beta$ decay of $^{65}$Ni and $^{56}$Mn produced by neutron capture in $^{64}$Ni and $^{55}$Mn. The electrical current is delayed having a time constant of 325 s. Manganese is present as an impurity in Inconel 600, but for use in a reactor Inconel 600 is usually specified to have a maximum concentration of 0.3 wt% Mn. Depending on the relative amounts of manganese present in the core wire conductor and sheath conductor of the MI cable this electrical current may be either positive or negative, but it is usually negative.

Thus the net electrical current from an Inconel-Inconel MI cable results, primarily, from three interactions, one of which is positive, one of which is negative, and one of which can be either. As a result, the total electrical current can be positive or negative depending on the dimensions of the cable and on the concentration of Mn present in the core wire conductor and sheath conductor. However, prior to the present invention, it was believed that the net, i.e. total, electrical current per unit length would remain relatively small compared with the electrical currents generated in the active portions, i.e. the emitter and collector electrodes, of conventional detectors, such as those with vanadium, platinum or rhodium emitter electrodes, if the lead cable geometry were changed.

A number of Inconel-Inconel MI cables having outside diameters as large as 3.0 mm were irradiated in a heavy water moderated, research reactor at Chalk River Nuclear Laboratories, Chalk River, Ontario, Canada. The dimensions of these MI cables and the results obtained from the irradiation tests are summarized in Table 1. A discussion of these results follows, but it is noted here that the sensitivity per unit length of the cable was found to increase rapidly with increasing core wire conductor diameter while the prompt fraction tended towards unity. This result was totally unexpected prior to the start of the test program. Prior to the present invention it was thought that Inconel could not be used as an emitter electrode material for a self-powered neutron flux detector because Inconel was thought to be substantially insensitive to neutron flux. This is supported by U.S. Pat. No. 3,904,881, dated Sept. 9, 1975, "Neutron Detector", E. Klar et al., and U.S. Pat. No. 3,940,627, dated Feb. 24, 1976, "Shielded-Emitter Neutron Detector", E. Klar, both of which teach that for all practical purposes nickel alloys, e.g. Inconel, are neutron insensitive.

TABLE 1

| INCONEL-INCONEL MI LEAD CABLE IDENTIFICATION | LEAD CABLE DIMENSIONS | | | TOTAL SENSITIVITY PER UNIT LENGTH OF LEAD CABLE | | ELECTRICAL CURRENT FRACTIONS | | | PROMPT FRACTION |
|---|---|---|---|---|---|---|---|---|---|
| | OD (mm) | SHEATH CONDUCTOR WALL THICKNESS (mm) | CORE-WIRE CONDUCTOR DIAMETER (mm) | Absolute $A \cdot m^{-1} / (n \cdot m^{-2} \cdot s^{-1})$ | Relative | $\frac{I(n,\gamma,e) + I(\gamma,e)}{I_{Total}}$ | $\frac{I(n,\beta)}{I_{Total}}$ | CS | |
| VC-0212 | 1.56 | 0.27 | 0.37 | 6.29 × 10$^{-27}$ | 1.00 | 1.23 | −0.23 | 1.00 | 1.38 |
| VC-0501 | 1.58 | 0.28 | 0.14 | −2.35 | −0.37 | 0.21 | +0.79 | −0.063 | −0.17 |
| VC-0502 | 1.58 | 0.28 | 0.28 | 1.18 | 0.19 | 2.85 | −1.85 | 0.44 | 3.60 |
| VC-503 | 1.58 | 0.28 | 0.41 | 7.34 | 1.17 | 1.39 | −0.39 | 1.32 | 1.41 |
| VC-0504 | 1.58 | 0.28 | 0.52 | 18.0 | 2.86 | 1.08 | −0.08 | 2.51 | 1.15 |
| UC-0105 | 2.19 | 0.38 | 0.51 | 16.7 | 2.66 | 1.16 | −0.16 | 2.51 | 1.41 |
| UC-0106 | 2.19 | 0.30 | 0.49 | 18.7 | 2.97 | 1.10 | −0.10 | 2.66 | — |
| UC-103 | 2.99 | 0.51 | 0.70 | 41.1 | 6.53 | 1.11 | −0.11 | 5.89 | 1.17 |
| UC-104 | 2.99 | 0.41 | 0.67 | 40.2 | 6.39 | 1.08 | −0.08 | 5.61 | — |

The results will now be considered in some detail. Since the total electrical current from an Inconel-Inconel MI cable consists, to a good approximation, of three separate electrical currents, as indicated by equation (1) we can define four separate sensitivities (per unit length) by $$S(n,\gamma,e) = \frac{I(n,\gamma,e)}{\int_0^L \phi(x)dx} \quad (2)$$

$$S(\gamma,e) = \frac{I(\gamma,e)}{\int_0^L \phi(x)dx} \quad (3)$$

$$S(n,\beta) = \frac{I(n,\beta)}{\int_0^L \phi(x)dx} \quad \text{and} \quad (4)$$

$$S_T = \frac{I_{Total}}{\int_0^L \phi(x)dx} \quad (5)$$

where
$\phi(x)$ is the neutron flux intensity at an elevation (x) in the reactor and
L is the length of the lead cable.
Note that $$S_T = S(n,\gamma,e) + S(\gamma,e) + S(n,\beta) \quad (6)$$

By observing the decay of the electrical current signal from the MI cables, following a fast reactor shut-down, it has been possible to determine $I(n,\beta)$ separately from $I_{total}$, but at the present time it has not been possible to accurately determine $I(n,\gamma,e)$ and $I(\gamma,e)$ separately. Therefore, in Table 1 the total sensitivities, $S_T$, are shown and on a relative basis the combined sensitivities, $CS = S(n,\gamma,e) + S(\gamma,e)$. Here it may be noted that the absolute sensitivities shown in Table 1 were obtained by measuring the flux, along the length of the lead cables with a miniature fission chamber. The absolute sensitivities may not be accurate to better than ±10% but the relative sensitivities are believed to be accurate to ~±3%.

The dependence of the combined sensitivity, $CS = S(n,\gamma,e) + S(\gamma,e)$, on the diameter, D, of the core wire conductor is illustrated in the graph of FIG. 1. It can be seen from FIG. 1, that, for core wire conductor diameters $\lesssim 1.0$ mm the sensitivity increased almost cubically with core wire conductor diameter. Further as can be seen from Table 1 the fraction of the total electrical signal which resulted from the delayed β-decay of $^{56}$Mn and $^{65}$Ni decreased rapidly with increasing core wire conductor size.

The rapid increase in the combined sensitivity, $CS = S(n,\gamma,e) + S(\gamma,e)$, was not anticipated at the beginning of the experimental program. A probable explanation is that it results primarily from an increase in $I(n,\gamma,e)$ with core wire conductor diameter. The $(n,\gamma,e)$ interaction is a two-step process. Ignoring self-shielding, the $(n,\gamma)$ interaction rate per unit length will be proportional to the core wire conductor cross-sectional area, i.e. the square of the core wire diameter, $D^2$. Since the escape probability for electrons generated near the centre of the core wire conductor, by Compton and photo-electric processes, is small, compared with that for electrons generated near the surface, the "effective" $(\gamma,e)$ interaction rate is expected to be approximately proportional to the core wire conductor surface area, i.e. the diameter, D. Thus, the $(n,\gamma,e)$ interaction rate will vary approximately as $D^3$. Therefore, the magnitude of the current attributable to the $(n,\gamma,e)$ process will increase rapidly with increasing core wire conductor diameter. This is a general rule and is not restricted to Inconel core wire conductors.

Table 1 also shows the values of the prompt fraction determined for each of the MI cables. The prompt fractions, i.e. the fractions of the total electrical current signal which follow changes in the neutron flux without (measurable) delay, were determined by comparing the decay of the electrical current signals from the MI cable following a fast reactor shutdown, with the decay of the signal from a miniature fission chamber. As can be seen from Table 1, the prompt fraction approached unity as the diameter of the core wire conductor increased. In other words, with increasing core wire conductor size the MI cable came closer to being a completely prompt device.

From the above it was deduced by the applicants that Inconel-Inconel MI cables could be used as a prompt-responding self-powered neutron flux detector if the core wire conductor diameters were sufficiently large.

In some applications to which a self-powered neutron flux detector is put, a measure of the average flux across a nuclear reactor core is desired and for this application a constant diameter Inconel-Inconel MI cable could be used. An acceptable prompt fraction would be obtained with a core-wire conductor diameter of $\gtrsim 0.9$ mm. Here it may be noted that few, if any, known types of self-powered neutron flux detectors are perfectly prompt.

Further, there is no general rule as to what value of prompt fraction is acceptable as this depends very much on the particular application. Frequently the designer of the system in which a self-powered neutron flux detector is to be used adjusts the design as required to accommodate the fact that the detector is not perfectly prompt.

In other applications to which a self-powered neutron flux detector is put, a measure of the average flux over a localized region of a nuclear reactor core is desired rather than over the complete nuclear reactor core. In such an application not only is the dynamic response important but it is also important that the signal produced by the 'detector' be large relative to the signal produced in the lead cable used to transmit the detector signal through the core of the nuclear reactor, and through the nuclear reactor shielding to the measuring instrumentation. A practical prompt-responding self-powered neutron flux detector assembly can be manufactured, using Inconel 600 as both the emitter electrode/lead cable core-wire conductor material and the collector electrode/lead cable sheath conductor material, wherein the electrical current signal generated in the flux detector is large relative to that produced in the lead cable, by using a neutron flux detector-lead cable design, such that the diameter of the emitter electrode of the neutron flux detector section is $\gtrsim 4$ times that of the lead cable core wire conductor.

Referring now to FIG. 2 there is shown a self-powered neutron flux detector assembly comprising (a) an emitter electrode 1 of substantially circular cross section, at least of the order of 0.9 mm in diameter, (b) a tubular collector electrode 2 enclosing and coaxial with the emitter electrode 1, and (c) dielectric material 4 between the said electrodes 1 and 2, and wherein the improvement comprises:

(d) the emitter electrode 1 is of metal selected from the group consisting of iron, nickel, titanium, chromium and alloys based on at least one of these elements, except for impurities, so that at least of the order of 90% of the total electrical current that will be induced in the detector is prompt and is derived from $(n,\gamma,e)$ interactions in said metal, and (e) the collector electrode 2 is of metal selected from the group consisting of iron, nickel, titanium, chromium, zirconium and alloys based on at least one of these materials, except for impurities.

The detector assembly has the emitter electrode 1 and the collector electrode 2 electrically connected to a means 18 for measuring an electrical current difference between these electrodes.

The collector electrode 2 has a closed end 14 and is sealed by, for example, an epoxy resin seal 16 at the other end.

In FIG. 3 similar parts to those shown in FIG. 2 are designated by the same reference numerals and the previous description is relied upon to describe them.

In FIG. 3 the detector assembly includes a coaxial, mineral insulated lead cable, generally designated 6. The lead cable 6 has a core wire conductor 8 and an outer conductor 10 each consisting of metal selected from the group consisting of iron, nickel, titanium, chromium, zirconium and alloys based on at least one of these elements, except for impurities. The emitter electrode 1 is electrically connected to the core wire conductor 8 and has a diameter at least of the order of four times that of the core wire conductor 8, and the collector electrode 2 is electrically connected to the outer conductor 10.

A transition section 12 connects the emitter electrode 1 to the core wire conductor 8 and the collector electrode 2 to the outer conductor 10. The more abrupt the transition section 12 the more satisfactory is the discrimination between the electrical signals generated in the detector and the lead cable 6. The most satisfactory transition section 12 would be one that is stepped but this is not possible if the detector and the lead cable 6 are reduced to their different sizes from a common inner conductor, insulation and outer conductor and so a compromise is made in that the transition section 12 is made as abrupt as it possibly can be.

In some embodiments of the present invention the outer diameters of the collector electrode 2 and the outer conductor 10 are the same.

A self-powered neutron flux detector assembly of the type shown in FIG. 3 was made with the emitter electrode 1, collector electrode 2 and electrical conductors 8 and 10 all of Inconel 600 and using MgO as the dielectric material 4. This self-powered neutron flux detector was made for tests in the radioactive core of a heavy water moderated test reactor.

The dimensions of this self-powered neutron flux detector assembly are summarized in the following Table 2.

TABLE 2

| | DIMENSIONS | |
|---|---|---|
| PARAMETER | DETECTOR SECTION | LEAD CABLE SECTION |
| Outside Diameter Sheath Wall | 3.01 mm | 1.56 mm |
| Thickness Insulation | 0.52 mm | 0.27 mm |
| Thickness Emitter Electrode/ | 0.23 mm | 0.33 mm |
| Core Wire Diameter | 1.51 mm | 0.37 mm |
| Length | 1.012 m | 1.353* m |

*This was the length of the lead cable which passed through the core of the nuclear reactor. The actual length of the lead cable from the detector to the top of the reactor shielding was ~6.3 m.

The important experimental results from tests using the self-powered neutron flux detector assembly shown in FIG. 3, in a heavy water moderated, test reactor, are summarized in the following Table 3. It should be noted that prompt-responding, self-powered neutron flux detector assemblies having emitter sections ~1 m long are commonly used in heavy-water moderated natural uranium nuclear reactors, in both the reactor control systems and the reactor safety systems.

TABLE 3

| Parameter | Experimental Result |
|---|---|
| Ratio of Detector Signal to Lead Cable Signal | ~32 |
| Total Detector Sensitivity | $2.23 \times 10^{-25} A \cdot m^{-1}/(n \cdot m^{-2} \cdot s^{-1})$ |
| Prompt Fraction | 1.060* |
| $I(n,\beta)/I_{Total}$ | −0.035* |

*Average of two measurements

It will be seen from Table 3 that the detector portion was close to 100% prompt and that the lead portion contributed only ~3% of the total electrical current signal. Other tests have shown that by reducing the core wire conductor diameter of the lead cable 6 to 0.25 mm, the lead cable electrical current signal could be reduced to <1% of the total signal. The fact that the prompt fraction exceeded unity, was a consequence of the fact that the delayed electrical current signals, from delayed reactor γ-rays and from the decay of $^{56}$Mn and $^{65}$Ni, were negative, whereas the prompt electrical current signal was positive. A prompt fraction slightly in excess of unity can be considered beneficial in a self-powered neutron flux detector assembly which is used in a nuclear reactor safety system. The measured detector sensitivity for the self-powered neutron flux detector assembly of Table 2 has been included in FIG. 1 as ⊙. As can be seen it was smaller than would have been expected on the basis of a simple extrapolation of the results obtained with the smaller sizes of Inconel-Inconel MI cable. This result is believed to be primarily a consequence of neutron self-shielding in the self-powered neutron flux detector assembly, although experimental errors may also have contributed.

The results shown in Table 3 clearly indicate that it is possible to make a prompt-responding, self-powered neutron flux detector assembly, having good discrimination between the self-powered neutron flux detector electrical current signal and the lead cable electrical current signal, of the type shown in FIG. 3, using Inconel as the material for all of the electrodes and conductors. Tests have shown that if a co-axial (non-compensated) lead cable 6 of the type shown in FIG. 3 is used, the diameter of the emitter electrode 1 should be at least of the order of four times that of the lead cable core wire conductor 8 if a measure of the average flux over a localized region of the core is desired.

In FIG. 4 similar parts to those shown in FIG. 2 are designated by the same reference numerals and the previous description is relied upon to describe them.

In FIG. 4 the self-powered neutron flux detector assembly includes a twin core, mineral insulated, lead cable 22 having two core wire conductors 24 and 26 of substantially the same diameter and metal, and an outer conductor 28. Each core wire conductor 24 and 26 and the outer conductor 28 is of metal selected from the group consisting of iron, nickel, titanium, chromium, zirconium and alloys based on at least one of these elements, except for impurities. The emitter electrode 1 is electrically connected to only one of the core wire conductors, i.e. core wire conductor 26, and has a diameter at least of the order of 2.5 times that of the core wire conductors 24 and 26. The collector electrode 2 is electrically connected to the outer conductor 28.

The self-powered neutron flux detector assembly shown in FIG. 4 is provided with twin core wire conductors 24 and 26 in the lead cable 22 for the purpose of compensating for the signal generated directly in the lead cable 22. This is accomplished by subtracting the electrical current, indicated by electrical current meter 30, from that indicated by the electrical current meter 32. An example of the prior art for this type of self-powered neutron flux detector assembly is disclosed in U.S. Pat. No. 3,400,289, dated Sept. 3, 1968, "Neutron Detector Having a Radioactive Vanadium Emitter", K. O. I. Andersson, Column 2, lines 63–70.

In FIG. 5 similar parts to those shown in FIG. 2 are designated by the same reference numerals and the previous description is relied upon to describe them.

In FIG. 5 the self-powered neutron flux detector assembly includes a first coaxial, mineral insulated lead cable generally designated 34 and a second coaxial, mineral insulated lead cable generally designated 35. The first lead cable 34 has a core wire conductor 36 and an outer conductor 38 each consisting of metal selected from the group consisting of iron, nickel, titanium, chromium, zirconium, and alloys based on at least one of these elements, except for impurities. The second lead cable 35, which is substantially identical to the first lead cable 34, is for compensating for any electrical current induced directly in the first lead cable. The emitter electrode 1 is electrically connected only to the core wire conductor 36 of the first lead cable 34 and has a diameter at least of the order of 2.5 times the diameter of each of the core wire conductors 36 and 40 of the first and second lead cables 34 and 35 respectively. The collector electrode 2 is electrically connected to the outer conductor 38 only of the first lead cable 34.

As previously stated the self-powered neutron flux detector assembly shown in FIG. 5 is provided with a second, compensating lead cable 35 for the purpose of compensating for any electrical current induced directly in the first lead cable 34. This is accomplished by subtracting the electrical current indicated by meter 42 from that indicated by the electrical current meter 44. An example of the prior art for this type of lead cable compensation is disclosed in the previously mentioned Hilborn patent, Column 5, lines 62–75.

Tests have shown that by compensating for the signal generated in the lead cable, for example by using a lead cable 22 having twin core wire conductors 24 and 26 as illustrated in FIG. 4 or by using a second lead cable 35 as illustrated in FIG. 5 the core wire conductors can be reduced, but because the self-powered neutron flux detector electrical current falls off almost as the cube of the emitter diameter, the ratio of the emitter to core wire diameters should not be smaller than ~2.5.

If the self-powered neutron flux detector assembly is used to measure the average flux across the complete core of a nuclear reactor, rather than over a localized region of the core, then the emitter and collector electrode portion of the detector assembly can be used for conveying the signal to the current meter, since tests have shown that the current generated in that portion of the detector assembly which passes through the reactor shielding is negligible compared with the current generated in the portion of the detector assembly which passes through the core of the reactor. However, to achieve a prompt fraction close to unity the diameter of the emitter electrode must be $\gtrsim 0.9$ mm.

An important advantage of a self-powered neutron flux detector assembly according to the present invention and using Inconel as an emitter electrode material, compared with other prompt responding self-powered neutron flux detectors, such as those employing cobalt as the emitter electrode material, is the much smaller burnout rate. The effective cross section for Inconel-600 is ~4 b (1 b=$10^{-28}$m$^2$) compared with that of 37 b for Co. Thus a self-powered neutron flux detector assembly having Inconel as the emitter electrode material will burn out ~9 times more slowly than will a similar detector having cobalt as the emitter electrode material. In fact, as will be discussed below, the sensitivity of the Inconel detector actually increases during the first few years of irradiation before it begins to decrease.

A prompt-responding self-powered neutron flux detector assembly with a low burn-out rate can be provided, according to the present invention, using materials other than Inconel-600 for the emitter electrode. To achieve a low burn-out the neutron capture cross-section must be relatively small although it can not be so small as to preclude generating a useful signal. To achieve a prompt response the materials of the detector assembly must not transmute, to any significant extent, to β-active daughters following neutron capture. Further, to achieve a prompt response the γ-ray sensitivity of the detector assembly must be relatively small to prevent delayed reactor γ-rays giving an appreciable delayed signal. Using the properties taught in "A Platinum In-Core Flux Detector", R. B. Shields, IEE Trans. Nucl. Sci., NS-20, 1973, p. 603, as a guide in selecting materials so as to achieve a low γ-ray sensitivity it can be deduced that the atomic number of the materials for the collector electrode conductor and the emitter electrode should preferably differ by not more than the order of 15.

Taking into account the requirements outlined above, a number of materials suitable for use in a prompt-responding, low burnout, self-powered neutron flux detector assembly, according to the present invention, have been selected and their important properties are summarized in the following Table 4 where the estimated values for the sensitivity, $S_R(n,\gamma,e)$, for the materials, relative to that of Inconel 600, are also given. These sensitivities were obtained from the following equation (7)

$$S_R{}^X(n,\gamma,e) = (\sigma_X \rho_X{}^2 N_X Z_X / A_X{}^2) \cdot (A_I{}^2 / \sigma_I \rho_I{}^2 N_I Z_I) \qquad (7)$$

where $S_R{}^X(n,\gamma,e)$ is the (n,γ,e) sensitivity for an emitter electrode of material X, relative to that for an Inconel 600 emitter electrode, $\rho_X$ is the density of material X, $A_X$ is the atomic weight of material X, $N_X$ is the average number of gamma-rays emitter per neutron capture in material X, $\sigma_X$ is the microscopic neutron capture cross-section for material X, $Z_X$ is the atomic number of material X and $A_I$, $\rho_I$, $N_I$, $\sigma_I$, and $Z_I$ are similarly defined for Inconel 600.

sensitivities of nickel, iron, chromium, and titanium, are comparable to that of Inconel-600. Further, the relative intensities of delayed electrical currents from the β-decay of radioactive daughters will be comparable to or smaller than the relative intensity of the delayed electrical current produced in Inconel-Inconel MI cables by the β-decay of $^{56}$Mn and $^{65}$Ni. Since the atomic numbers of nickel, iron, chromium, and titanium, are close to one another and to that of Inconel-600, the γ-ray electrical current sensitivities of MI cables produced from these materials will be close to that of Inconel-Inconel MI cable. Thus a prompt-responding, low burnout self-powered neutron flux detector assembly according to the present invention can be manufactured using any combination of nickel, iron, chromium, titanium and alloys of these materials for the emitter electrode and collector electrode of the device. If the self-powered neutron flux detector assembly is to be used to measure the flux over a localized region of a reactor core the diameter of the emitter electrode should preferably exceed that of the lead cable core wire to achieve a sufficiently large detector current relative to that produced in the lead cable. If the self-powered neutron flux detector assembly is to provide a measure of the average flux over the whole core then it need not be tapered but the emitter diameter should not be significantly smaller than 0.9 mm.

From Table 4, it will be seen that zirconium, and hence zirconium based alloys such as Zircaloy, are not suitable for use as the emitter electrode material of a prompt-responding self-powered neutron flux detector assembly according to the present invention because of zirconium's low neutron sensitivity. However, zirconium and zirconium-based alloys, such as Zircaloy, can be used as the collector electrode material as well as iron, nickel, chromium, titanium and/or alloys of these materials. A detector assembly having a zirconium collector electrode will have a somewhat larger negative γ-ray sensitivity than if a lower Z material were used as

TABLE 4

| Material | Z | A | ρ g/cm³ | σ (b) | N | $S_R(n,\gamma,e)$ | Principal β-Active Daughters | % of Captures Producing Principal β-Active Daughter | Suitable For Use As |
|---|---|---|---|---|---|---|---|---|---|
| Inconel-600 | 27 | 57.1 | 8.4 | 4.05 | 1.5 | 1.00 | $^{56}$Mn $^{65}$Ni | 1.2* | Emitter and collector electrodes, lead cable core wire and outer conductors. |
| Nickel | 28 | 58.7 | 8.9 | 4.43 | 1.4 | 1.12 | $^{65}$Ni | 0.32 | Emitter and collector electrodes, lead cable core wire and outer conductors. |
| Iron | 26 | 55.8 | 7.9 | 2.55 | 1.7 | 0.64 | $^{59}$Fe | 0.14 | Emitter and collector electrodes, lead cable core wire and outer conductors. |
| Chromium | 24 | 52.0 | 7.1 | 3.1 | 1.9 | 0.74 | $^{55}$Cr | 0.27 | Emitter and collector electrodes, lead cable core wire and outer conductors. |
| Titanium | 22 | 47.9 | 4.5 | 6.1 | 2.3 | 0.77 | $^{51}$Ti | 0.16 | Emitter and collector electrodes, lead cable core wire and outer conductors. |
| Zirconium | 40 | 91.2 | 6.4 | 0.185 | 3.4 | 0.03 | $^{95,97}$Zr | 5.6 | Collector electrode and lead cable core wire outer conductors only |

*Assuming the Mn content is 0.3 wt %

The estimates of the relative electrical current intensities can not be considered to be highly accurate since the energy distributions of the capture γ-ray spectra have not been taken into account. Nonetheless they serve as a useful guide and indicate that the neutron the collector electrode, but the detector assembly will still be close to 100% prompt. Zirconium and zirconium based alloys such as Zircaloy can also be used for the core wire conductor material of the lead cable. There is a distinct advantage in using zirconium or a zirconium-based alloy as the collector electrode material in that the flux depression produced by such a self-powered neutron flux detector and the neutron load therefrom on the nuclear reactor will be significantly smaller than if one of the other proposed materials were used as the collector electrode material. Thus zirconium and alloys of zirconium are preferable materials for the collector electrode. Nickel is also a preferable material for the collector electrode because of the relative ease of fabrication using this material.

As can be seen from Table 4, nickel is the preferred material for the emitter electrode because of its relatively large sensitivity and small delayed component. Using nickel as an emitter material has an added advantage. The most abundant nickel isotope is $^{58}$Ni which forms 68% of the natural element, and which has an absorption cross section of 4.6 b. This isotope transmutes to $^{59}$Ni, when it captures a neutron, and $^{59}$Ni has a total neutron cross section of 104 b.

Thus every nuclide of $^{58}$Ni which captures a neutron is replaced by a nuclide of $^{59}$Ni which has a much larger neutron capture cross section, so that, initially, the detector sensitivity actually increases as a result of the irradiation, i.e. the detector breeds.

For the test detector fabricated using Inconel-600 which contains ~76% Ni, the signal actually increased by ~20% over a period of ~7 months. For an Inconel detector assembly, the current, $I_I(t)$, following an irradiation for a time t in a flux, $\phi$, is given by $$I_I(t) = I_I(0)e^{-\sigma_I \phi t} + I_{59}(t) \qquad (8)$$

where $I_I(0)$ is the initial current from the Inconel detector assembly, $\sigma_I$ is an effective cross section to describe the burnout of Inconel, and $I_{59}(t)$ is the current generated by neutron capture in $^{59}$Ni.

Since $I_{59}$ results from capture in $^{59}$Ni, it will be proportional to the relative number of $^{59}$Ni nuclides per unit volume, $\chi_{59}$, i.e.

$$I_{59} = K\chi_{59} \qquad (9)$$

But since $^{59}$Ni results from neutron capture in $^{58}$Ni, we have $$d\chi_{59}/dt = \sigma_{58}\phi\chi_{58} - \sigma_{59}\phi\chi_{59} - \lambda_{59}\chi_{59} \qquad (10)$$

$$d\chi_{58}/dt = -\sigma_{58}\phi\chi_{58} \qquad (11)$$

where $\chi_{58}$ is the relative number of $^{58}$Ni nuclides per unit volume and $\lambda_{59}$ is the decay constant for $^{59}$Ni.

Since $\lambda_{59} << \sigma_{59}\phi$ for typical reactor fluxes, we have $$d\chi_{59}/dt \approx \sigma_{58}\phi\chi_{58} - \sigma_{59}\phi\chi_{59} \qquad (12)$$

Solving equations (11) and (12) subject to the boundary conditions that at time 0

$$\chi_{58} = \chi_{58}(0) \qquad (13)$$

$$\chi_{59} = 0 \qquad (14)$$

we have $$\chi_{59} = \frac{\chi_{58}(0)\sigma_{58}}{\sigma_{59} - \sigma_{58}} (e^{-\sigma_{58}\phi t} - e^{-\sigma_{59}\phi t}) \qquad (15)$$

So $$I_{59} = \frac{k\sigma_{58}}{\sigma_{59} - \sigma_{58}} (e^{-\sigma_{58}\phi t} - e^{-\sigma_{59}\phi t}) \qquad (16)$$

$$= kf(\phi t) \qquad (17)$$

where $$k = K\chi_{58}(0) \qquad (18)$$

Hence we have for the Inconel detector $$I_I(t) = I_I(0)e^{-\sigma_I \phi t} + kf(\phi t) \qquad (19)$$

Experimentally we have found that after an irradiation for a period of ~0.6 of a year in a mean flux of ~2×10$^{18}$ n·m$^{-2}$·s$^{-1}$, the signal from the test detector increased by a factor of 1.22.

Assuming $\sigma_I = 4.6$ b, we have $$1.22 = (0.983) + (k/I(0))1.427 \times 10^{-2} \qquad (20)$$

so $$k/I_I(0) = 16.5 \qquad (21)$$

Equations (16), (19), and (21) can be used to estimate the change in the current generated by an Inconel detector assembly as a function of the irradiation history of the detector assembly. Table 5 summarizes the results obtained for a detector assembly irradiated in a mean flux of 2×10$^{18}$ n·m$^{-2}$·s$^{-1}$. Also shown are the results to be expected using a pure nickel emitter. The initial sensitivity of the nickel detector is ~5% greater than that of an equivalent Inconel detector, and the value of $k/I_I(0)$, for the nickel detector, is a factor of 1.32 greater than that for the Inconel detector since Inconel contains only 76% nickel. Here we have assumed that the effective cross section for burnout of both the Inconel and nickel detectors is 4.6 b.

TABLE 5

THE CHANGE IN THE SIGNALS FROM AN INCONEL AND A NICKEL DETECTOR, AS A FUNCTION TIME, ASSUMING A CONSTANT FLUX OF 2 × 10$^{18}$ n · m$^{-2}$ · s$^{-1}$

| Time (a) | $I_I(t)$ | $I_{Ni}(t)$ |
|---|---|---|
| 0 | 1.00 | 1.05 |
| 1 | 1.32 | 1.48 |
| 2 | 1.46 | 1.67 |
| 3 | 1.51 | 1.75 |
| 4 | 1.52 | 1.76 |
| 6 | 1.47 | 1.71 |
| 8 | 1.40 | 1.63 |
| 10 | 1.32 | 1.54 |
| 15 | 1.14 | 1.33 |
| 20 | 0.99 | 1.15 |

As can be seen, the signal from the Inconel detector increases for the first 4 years or so and then decreases. After ~4 years $^{59}$Ni is burned out as fast as it is produced. Thereafter the signal decreases as $^{58}$Ni burns out and the ratio of $I_{59}$ to the total remains approximately constant.

As can be seen, the signal from the nickel detector is predicted to increase more than that from the Inconel detector. In both cases the increase is significant, and after an irradiation of 20 years the detector is still as sensitive as when it was first installed.

Thus nickel is the preferred material for the emitter electrode.

It should be noted that, in general, different materials may be used for the lead cable portion of the self-powered neutron flux detector assembly to those used for the emitter electrode.

Thus as a result of an investigation of Inconel-Inconel MI cables, it has been found, according to the present invention, that prompt responding, low burnout self-powered flux detector assemblies can be made according to the present invention using nickel, iron, chromium, titanium and alloys of these materials as the emitter electrode material in combination with nickel, iron, chromium titanium, zirconium and alloys of these materials as the collector electrode material. To obtain a reasonable prompt to delayed signal ratio, the emitter electrode diameter should be at least of the order of 0.9 mm. If the detector assembly is to be used to measure the neutron flux intensity over a localized region of a nuclear reactor core the diameter of the emitter electrode, of the detector portion will usually have to be larger than the diameter of the core wire conductor in the lead cable portion. If a coaxial lead cable is used, without compensation, the diameter of the detector emitter section should not be less than of the order of 4 times the diameter of the core wire conductor of the lead cable. By compensating for the electrical signal generated in the lead cable, either by using a twin core wire conductor lead cable or by measuring the current from a second lead cable provided for that purpose, the ratio of the emitter electrode diameter to lead-cable diameter can be reduced but this ratio should not be less than of the order of 2.5.

We claim:

1. A self-powered neutron flux detector assembly which provides a measure of the average neutron flux along the length of the detector comprising:
   (a) an emitter electrode of substantially circular cross section, at least of the order of 0.9 mm in diameter,
   (b) a tubular collector electrode enclosing and coaxial with the emitter electrode, and
   (c) dielectric material between the said electrodes, and wherein the improvement comprises,
   (d) the emitter electrode is of metal selected from the group consisting of iron, nickel, titanium, chromium and alloys based on at least one of these elements, except for impurities, so that at least of the order of 90% of the total electrical current that will be induced in the detector is prompt and is derived from (n,γ,e) interactions in said metal, and
   (e) the collector electrode is of metal selected from the group consisting of iron, nickel, titanium, chromium, zirconium and alloys based on at least one of these materials, except for impurities.

2. A self-powered neutron flux detector assembly according to claim 1, which includes a coaxial, mineral insulated lead cable, the lead cable has a core wire conductor and an outer conductor each consisting of metal selected from the group consisting of iron, nickel, titanium, chromium, zirconium, and alloys based on at least one of these elements, except for impurities, the emitter electrode is electrically connected to the core wire conductor and has a diameter at least of the order of four times that of the core wire conductor and the collector electrode is electrically connected to the outer conductor.

3. A self-powered neutron flux detector assembly according to claim 1, which includes a first coaxial, mineral insulated lead cable, the first, lead cable has a core wire conductor and an outer conductor each consisting of a metal selected from the group consisting of iron, nickel, titanium, chromium, zirconium and alloys based on at least one of these elements, except for impurities, and a second coaxial, mineral insulated lead cable, which is substantially identical to the first lead cable, and is provided to compensate for any electrical current induced directly in the first lead cable, the emitter electrode is electrically connected only to the core wire conductor of the first lead cable and has a diameter at least of the order of 2.5 times the diameter of each of the core wire conductors of the first and second lead cables and the collector electrode is electrically connected to the outer conductor only of the first lead cable.

4. A self-powered neutron flux detector assembly according to claim 1, which includes a twin-core, mineral insulated, lead cable, having two core wire conductors of substantially the same diameter and metal, and an outer conductor, each core wire conductor and the outer conductor is of metal selected from the group consisting of iron, nickel, titanium, chromium, zirconium, and alloys based on at least one of these elements, except for impurities, the emitter electrode is electrically connected to only one of the core wire conductors and has a diameter at least of the order of 2.5 times that of the core wire conductors, and the collector electrode is electrically connected to the outer conductor.

5. A detector assembly according to claims 2, 3 or 4, wherein the emitter electrode, the collector electrode, and the lead cable conductors are of the same metal.

6. A detector assembly according to claims 2, 3 or 4, wherein the emitter electrode, the collector electrode and the lead cable conductors are of Inconel-600.

7. A detector assembly according to claim 1, wherein the emitter and collector electrodes are of the same metal.

8. A detector assembly according to claim 1, wherein the emitter and collector electrodes are of Inconel-600.

* * * * *